No. 611,738. Patented Oct. 4, 1898.
H. MICHAEL.
HORSE DETACHING DEVICE.
(Application filed Feb. 23, 1898.)
(No Model.)
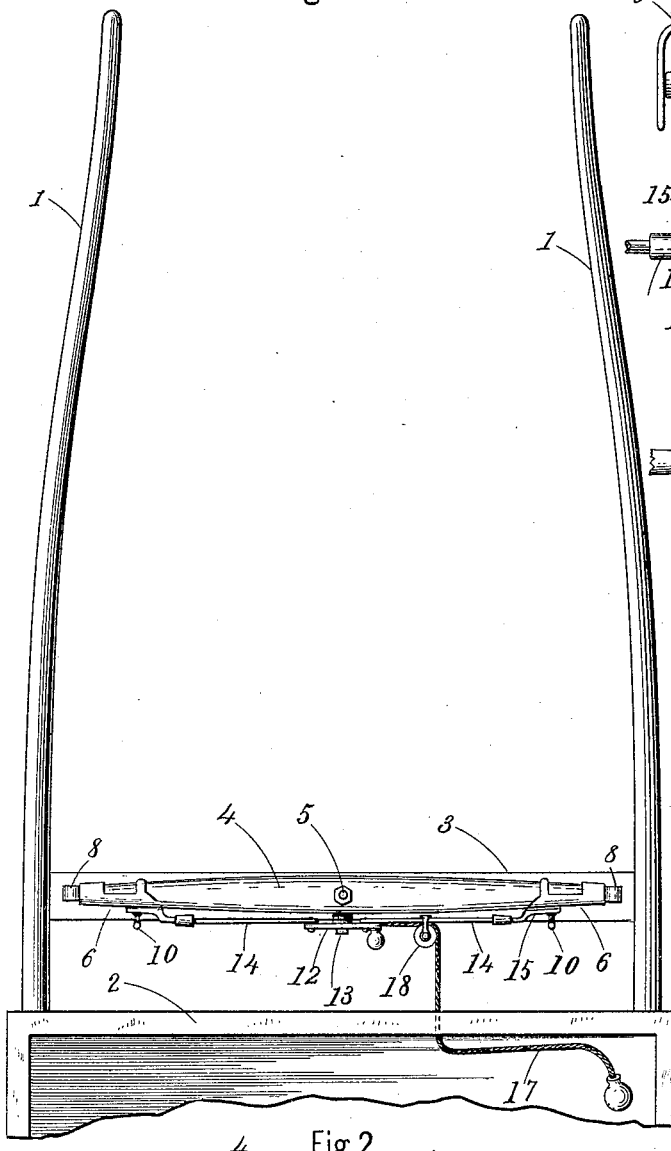
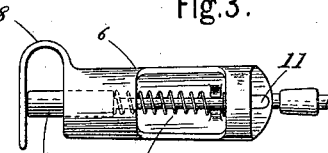
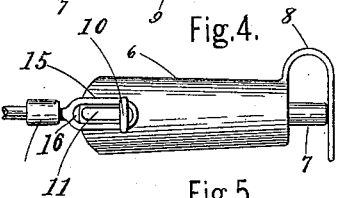
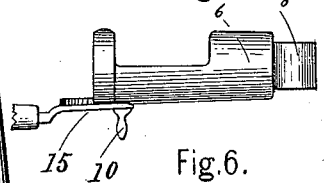
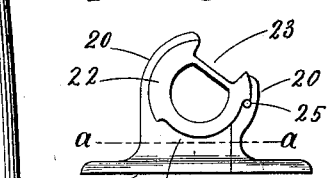
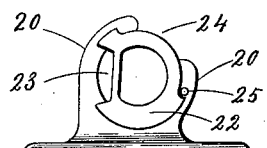
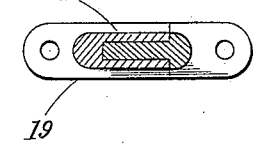
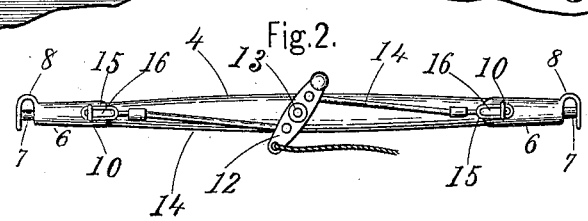
Witnesses,
A. F. Sangster.
G. A. Newbauer.
Henry Michael, Inventor.
By James Sangster, Attorney.
THE NORRIS PETERS CO., PHOTO-LITHO., WASHINGTON, D. C.

UNITED STATES PATENT OFFICE.

HENRY MICHAEL, OF HAMBURG, NEW YORK.

HORSE-DETACHING DEVICE.

SPECIFICATION forming part of Letters Patent No. 611,738, dated October 4, 1898.

Application filed February 23, 1898. Serial No. 671,229. (No model.)

*To all whom it may concern:*

Be it known that I, HENRY MICHAEL, a citizen of the United States, residing at Hamburg, in the county of Erie and State of New York, have invented certain new and useful Improvements in Horse-Detaching Devices, of which the following is a specification.

My invention relates to an improved device for detaching a horse and his harness from the shafts and running-gear of a vehicle, to the improved means for effecting the detachment from the seat of the vehicle, and to certain other details of construction, all of which will be fully and clearly hereinafter described and claimed, reference being had to the accompanying drawings, in which—

Figure 1 represents a plan view showing a front view of a light wagon and the thills and singletree, showing also a top view of my improved device. Fig. 2 represents a rear side elevation of a singletree, showing my invention combined therewith. Fig. 3 represents an enlarged detached front elevation of one of the detaching devices. Fig. 4 represents an opposite elevation of the same. Fig. 5 represents a top or plan view of the device shown in Fig. 4. Fig. 6 represents an enlarged side elevation of that portion of the device for releasing the horse from the thills, showing the position of the movable portion of the device when the holdback-strap is released. Fig. 7 represents the same device, showing its movable portion in position for securing the holdback-strap. Fig. 8 represents a horizontal section on or about line *a a*, Fig. 6, through the device for securing the holdback-strap.

Referring to the accompanying drawings, in which like numerals designate like parts, 1 represents the thills, which are secured to the wagon 2 in the usual and well-known way. A detached portion of the wagon 2 with the thills attached thereto is shown in Fig. 1.

The usual transverse brace for connecting the thills is designated by the numeral 3, and the singletree 4 is pivoted to the brace 3 by the bolt 5 in the usual and well-known way.

To each end of the singletree I rigidly secure a tubular shell 6, in which is supported the sliding locking-pin 7, a portion of the singletree end being cut away to permit the free longitudinal movement of the pin 7 therein. A U-shaped loop portion 8 extends from the outer end of each shell, against which the end of the pin strikes when in its locked position, as shown in Fig. 3. A spiral spring 9 encompasses the pin, the purpose of which is to hold the pin normally in its locking position. A finger 10 projects from the locking-pin through the slot 11 in the shell to afford means for withdrawing the pin and detaching the trace. The end of said finger projects sufficiently to permit the withdrawal of the pin from the side of the thills independent of the device extending to the body of the vehicle. By this means one of the traces may be unfastened independently of the other, if desired.

An operating-arm 12 is pivoted to the singletree at or near its center by a pin 13, and connecting-rods 14 extend, respectively, from opposite sides of said arm to the slotted portions 15, through the slots 16 of which the finger 10 projects to operatively connect the locking-pins with the operating-arm 12. The said slot 16 is made of sufficient length to permit the withdrawal of the locking-pin without disturbing or moving the slotted portions. A cord 17 extends from the operating-arm 12 over the pulley 18 and into the body of the wagon. (See Fig. 1.)

The device for securing the holdback-strap to the thills consists of the base 19, which is secured to the thills by screws or other well-known means, the circular portion 20, which extends upward from one side of said base and slightly beyond the center, the short portion 21, which extends from the opposite side, both portions forming portions of the same circle and having sufficient space between their ends to allow for the entrance of the holdback-straps, and the grooved disk 22, which is fitted and rotatably supported within the curved portions 20 and 21. The disk 22 has a portion of its peripheral surface cut away, leaving an opening 23 for the reception of the holdback-strap.

To provide means for limiting the rotation of the disk within the curved portions, a portion of one side of the disk on its periphery is cut away, forming a depression 24, and a projecting stop 25 is placed upon one of the curved supports, which strikes against the terminations of the depression, thus limiting its movement. (See Figs. 6 and 7, where this is clearly shown.)

To afford means for the removal of the disk from or replacement within the curved supports, the depression 23 can be made deep enough to make the distance diametrically from its deepest point to the opposite side of the disk shorter than the distance between the ends of the curved supports, and thus allow it to be withdrawn between the said ends.

To release the horse and his harness from the running-gear when seated in the vehicle, the cord 17 is pulled forward a sufficient distance to turn the operating-arm far enough to draw the locking-pins within the shell, thus releasing the traces. The horse in moving forward automatically rotates the disks 22 and releases the holdback-straps, the automatic action of the disks being rendered certain by the stop mechanism, which permits only a partial rotation of the disks within their supports, thus obviating all danger of the disks getting upon a dead-center.

If desired, the locking-pins can be withdrawn from the side of the thills by a person standing upon the ground by means of the fingers 10.

I claim as my invention—

1. A holdback-strap-securing device, consisting of a base portion provided with means for attachment to the thills, a substantially circular supporting portion having a portion cut away, a grooved disk provided with an opening on one side and supported in said circular portion, and a stop mechanism for limiting the rotation of said disk, as set forth.

2. In a horse-detaching device, the combination with the vehicle, its running-gear, thills, cross-bar and singletree, of a tubular shell provided with a slot secured to each end of said singletree, a trace-holding pin supported in each shell, and free to move longitudinally therein, springs for holding said pins normally in a locked position, a finger extending from each pin through the slot in its supporting-shell, an operating-arm pivoted at or near the center to the singletree, two rods pivotally fastened at their inner ends to opposite sides of the said operating-arm, and having slotted outer ends through which the fingers pass, and a flexible rod or cord extending from the operating-arm over a pulley and to within convenient reach of the driver for withdrawing the pins and releasing the traces, whereby the trace-holding pins may be withdrawn together by the cord or independently of each other by the projecting fingers, substantially as described.

3. A holdback-strap-securing device, consisting of a base portion adapted to be rigidly fastened to the thills of the vehicle, an upward-extending circular portion extending up from one side of said base and slightly beyond the center thereof, a short portion extending upward from the opposite side, a circular disk having a peripheral groove into which said portions are adapted to fit to support it, and provided with a depression to receive the loop of the strap, and a stop device for limiting its rotation, as set forth.

4. In a horse-detaching device, the combination with the vehicle, its running-gear, thills, cross-bar and singletree, of a tubular shell secured to each end of said singletree, a trace-holding pin supported in each shell, and free to move longitudinally therein, springs for holding said pins normally in a locked position, a finger extending from each pin, an operating-arm pivoted at or near the center of the singletree, two cords or rods pivotally fastened at their inner ends to opposite sides of said operating-arm, and having slotted devices at their outer ends through the slots of which the fingers pass and a flexible rod or cord extending from the operating-arm to within convenient reach of the driver for withdrawing both pins together and releasing the traces, the slotted devices providing means whereby either of the locking-pins may be withdrawn independently of the other by means of its projecting finger, substantially as described.

5. A holdback-strap-securing device, consisting of a disk having a peripheral groove and an opening into which the end of the strap is adapted to be placed, a base having a device fitting in the groove of the disk for rotatably supporting the same and a stop mechanism for limiting the rotation of said disk.

HENRY MICHAEL.

Witnesses:
A. J. SANGSTER,
G. A. NEUBAUER.